Sept. 20, 1971 G. W. C. VAN DER HORST 3,605,235
DEVICES TO INTERCONNECT PARTS OF A DIVISIBLE LAMINATED
MAGNETIC CORE STRUCTURE FOR A TRANSFORMER OR A CHOKE
COIL OF GREAT POWER
Filed Jan. 27, 1969 2 Sheets-Sheet 1

INVENTOR
GERARDUS W. C. VAN DER HORST
BY
ATTORNEYS

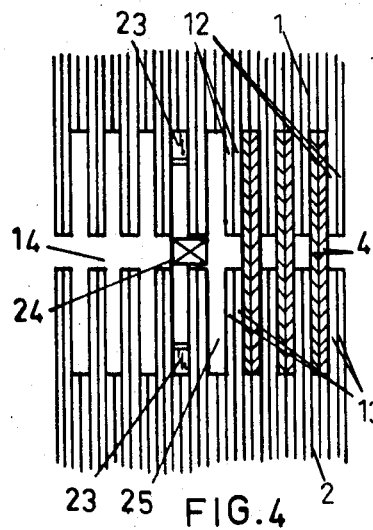
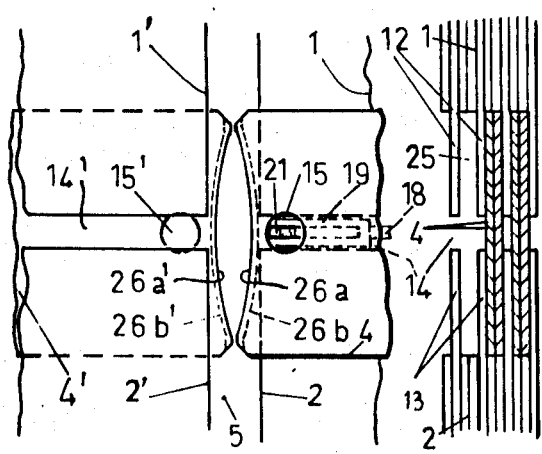
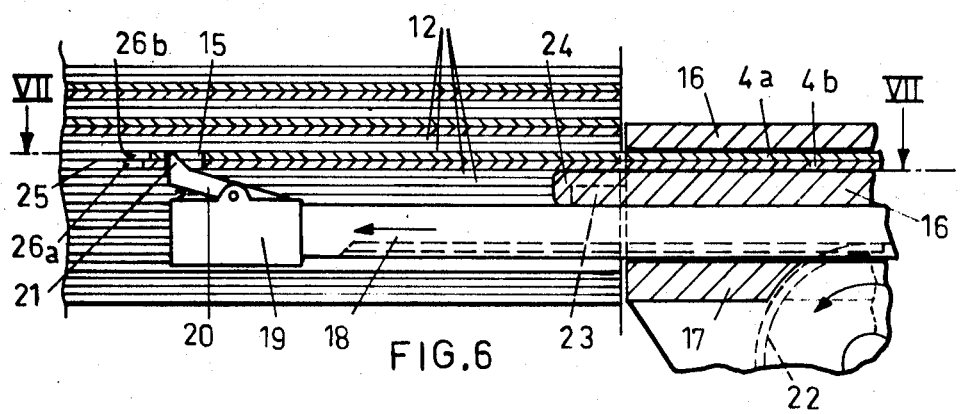
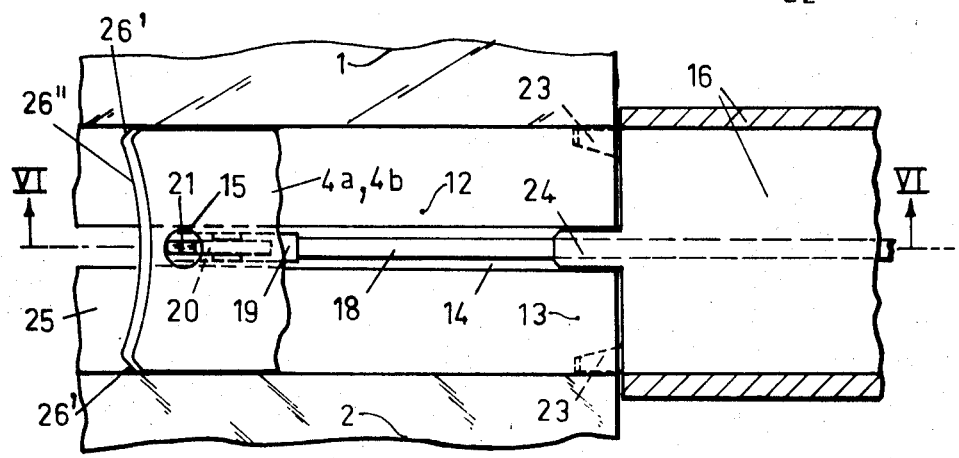

United States Patent Office 3,605,235
Patented Sept. 20, 1971

3,605,235
DEVICES TO INTERCONNECT PARTS OF A DIVISIBLE LAMINATED MAGNETIC CORE STRUCTURE FOR A TRANSFORMER OR A CHOKE COIL OF GREAT POWER
Gerardus W. C. van der Horst, Berg en Dal, Netherlands, assignor to Smit Nijmegen Electrotechnische Fabrieken N.V., Nijmegen, Netherlands
Filed Jan. 27, 1969, Ser. No. 794,295
Claims priority, application Netherlands, Feb. 19, 1968, 6802295
Int. Cl. H01r 19/04
U.S. Cl. 29—203L
5 Claims

ABSTRACT OF THE DISCLOSURE

A device to drive strip-shaped coupling laminations home into the spaces left between laminations protruding towards each other and forming part of two parts to be interconnected of a magnetic core for a transformer or a choke coil, said device comprising a guiding shaft for guiding and a driving mechanism for moving said coupling laminations, said guiding shaft being provided with fixing members which are arranged in offset relation to the discharge opening of said shaft.

---

Figure 1:
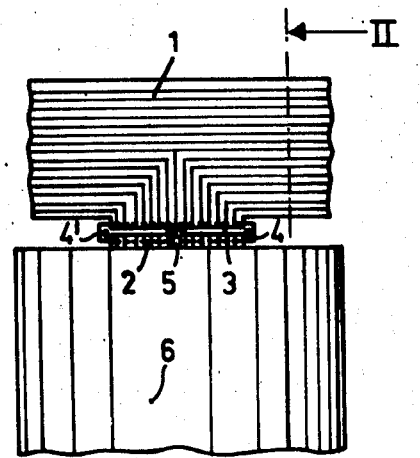

The invention relates to a device to insert strip-shaped coupling laminations into the spaces left between laminations protruding towards each other and forming part of two parts to be interconnected of a divisible laminated magnetic core structure for a transformer or a choke coil of great power, in which the protruding laminations of one core part lie in the same layers as those of the other core part, said device comprising a shaft for guiding the coupling laminations to be inserted in said spaces, means to fix said shaft in the position of operation and provided on said guiding shaft, said fixing means projecting from the discharge opening of said shaft and being adapted to be inserted into the space confined by said core parts, said guiding shaft being positioned in said position of operation with its discharge opening directly on front of such a space, and a mechanism connected to said guiding shaft and adapted to drive the coupling laminations home from said shaft into said spaces.

Devices of this kind have been described in the parallel Dutch patent applications 6700909 of the Jan. 20, 1967 and 6717463 of the Dec. 12, 1967. In this device the fixing means are so arranged at the discharge end of the guiding shaft that they will have to enter same space as the one, into which the coupling lamination has to be inserted. This has the advantage, that these fixing means can be so formed as to force the protruding laminations confining the relevant space a little bit away from one another, so that the coupling lamination can be easily inserted with its leading end into said space. This construction has the disadvantage, that the fixing means require in the said spaces additional space, so that the coupling laminations can be made less broad than said spaces and thereby gaps causing magnetic losses are left in the magnetic core structure.

The invention has for its object to avoid this disadvantage of the formerly proposed devices for inserting coupling laminations. It consists in that the fixing means are positioned in offset relation to the discharge opening of the guiding shaft, in such a manner, that the fixing means on one hand and the discharge opening of said shaft on the other hand can only be brought into cooperation with different spaces left between protruding laminations of both core parts. If in this device the guiding shaft has to be positioned in front of a space to be filled with a coupling lamination, the fixing means could for instance be inserted into the next still open space.

During operation of this device the protruding laminations confining the space to be filled are not forced away from one another by the fixing means, so that the coupling lamination to be inserted could come with its leading edge into contact with a protruding lamination edge facing the guiding shaft, whereby the insertion of said coupling lamination into said space will become difficult. It has appeared that this difficulty can be reduced, when the guiding shaft and the driving mechanism are made for the simultaneous insertion of at least two coupling laminations lying one on top of the other. In that case the laminations of the core parts must be so stacked as to allow two coupling laminations lying on top of each other to be simultaneously inserted into the spaces left between the protruding laminations.

If the device is used to insert strip-shaped coupling laminations into the spaces left between protruding laminations of two parts of a magnetic core structure which have to be interconnected and are separated by a gap, the guiding shaft is preferably provided, near the narrow sides of the discharge opening of the shaft, with two fixing members which are each adapted to be inserted between protruding laminations of a core part and, in the middle of a broad side of said discharge opening with one fixing member adapted to be inserted into the gap left between the two core parts. The middle fixing member can be made more sturdy and longer than the outer fixing members. Then the right positioning of the device in front of the core parts to be interconnected is facilitated considerably.

It has been found, that the difficulty of inserting the coupling laminations with their leading ends provisionally between the protruding laminations of the core parts to be interconnected in order to facilitate their being driven home mechanically, can be practically entirely avoided, when the strip-shaped coupling lamination to be inserted into a space by the device referred to is provided with a broken or curved leading edge having bevelled or curved end portions, which extend from the longitudinal edges of the coupling lamination both forward and towards one another, as well as a receding intermediate portion. In that case the coupling lamination will have forwardly projecting portions near its longitudinal edges, said portions forming pilot means which are inserted first into the space between protruding laminations of the core parts and particularly in places near the narrow sides of spaces where the protruding laminations are kept at the right distance from one another by the receding laminations. As soon as said protruding pilot portions have been inserted into the space the protruding laminations are gradually forced away from one another by the receding intermediate portion of the leading edge of the coupling lamination, should said protruding laminations be bent towards each other and thereby bar the entrance of said space.

It has already been said, that a set of at least two strip-shaped coupling laminations lying one on top of the other can be easierly driven home by the device constructed in accordance with the invention than a single coupling lamination. And this is the more so, when the coupling laminations of such a set are so placed one on top of the other as to have their leading edges lying in offset relation in the longitudinal direction of said laminations. The coupling laminations then will find their positions one a little bit after the other in the space to be filled with said set of coupling laminations.

Figure 2:
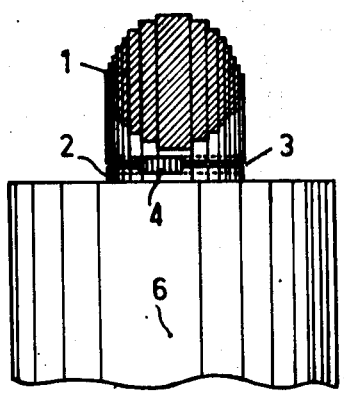
Figure 3:
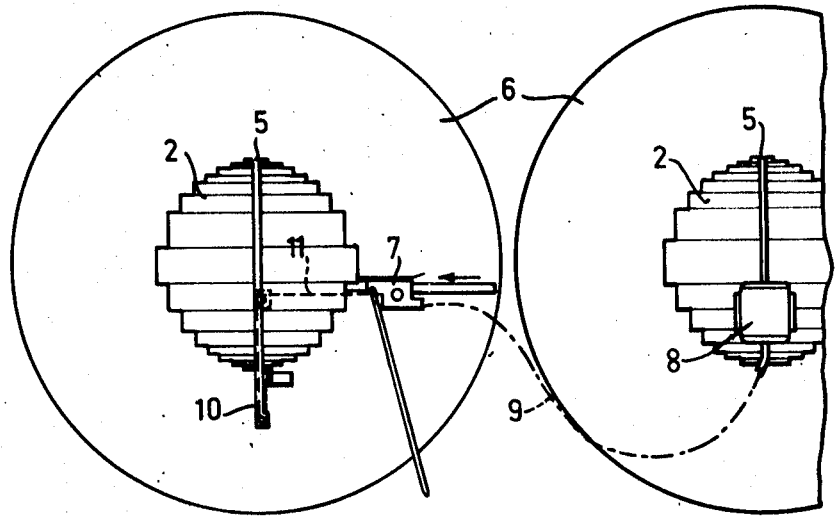

The invention will be further elucidated with the aid of the drawing. Therein is:

FIG. 1 an elevational view of a portion of a three-phase transformer having a divisible magnetic core structure, of which the yoke portions are detachably connected with the leg portions by coupling laminations, FIG. 2 a cross sectional view taken on line II—II in FIG. 1, FIG. 3 on a larger scale a device constructed in accordance with the invention for inserting coupling laminations into the magnetic core structure of the transformer shown in FIGS. 1 and 2, said device being in its operational position, FIG. 4 almost on true scale a cross sectional view of portions of the core parts to be interconnected, in which for the sake of clearness the usually only 0.3 mm. thick laminations are made too thick, FIG. 5 an elevational view of a layer of laminations of the portion shown in FIG. 4 of the core parts interconnected by coupling laminations, FIG. 6 a cross sectional view taken on the line VI—VI in FIG. 7 during the simultaneous insertion of two coupling laminations, FIG. 7 a cross sectional view taken on the broken line VII—VII in FIG. 6 and FIG. 8 a variant of the stacking arrangement of the laminations shown in FIG. 4.

In FIG. 1 and 2 the yoke portion and a leg portion of a laminated magnetic core structure of a three-phase transformer are designated by 1 and 2, respectively. Said core structure can be divided into parts at 3. Inserted between this yoke portion and this leg portion are coupling laminations 4, 4', some of which are shown in FIG. 2. The leg portion 2 has a cooling gap 5 and supports a winding 6.

FIG. 3 illustrates that for inserting the coupling laminations 4, 4', a device is used which consists of three parts, namely the part 7 comprising a guiding shaft for guiding and a driving mechanism for moving the coupling laminations, a motor 8 to drive the driving mechanism, said motor being coupled with said mechanism by a flexible driving shaft 9, and a clamping device 10 for holding the driving mechanism in place when a coupling lamination 4, 4', is inserted into the space left between the yoke portion 1 and the leg portion 2, said clamping device being connected with the driving mechanism by a rope 11.

It appears from FIG. 4 that the two parts 1, 2 to be interconnected of the laminated magnetic core structure comprise in the same layers laminations 12, 13 protruding towards each other and that these core parts are separated by a gap 14 having a width of 5–6 mm. It further appears that pairs of coupling laminations 4, 4', lying side-by-side are inserted into the spaces between the protruding laminations 12, 13. The remaining portions of the gap 14 left between the protruding laminations 12, 13 will not be filled.

If the leg portion 2 to be connected to the yoke portion 1 is provided with a cooling gap 5, two groups of coupling laminations are inserted said groups each connecting one of the two leg parts 2, 2', separated by said cooling gap 5 with the yoke portion 1 (see FIG. 5). Each pair of coupling laminations 4, 4', are provided with aligned openings 15, 15' at least near their inner end edges are aligned and in which so as to receive a pawl member of the driving mechanism 7 (FIG. 3).

The device to drive the coupling laminations 4, 4' home into the spaces between the protruding laminations 12, 13 of the core parts 1, 2 to be interconnected is partly illustrated in FIGS. 6 and 7. This device is provided with a short guiding shaft or roller 16 for guiding a pair of coupling laminations 4a, 4b to be inserted. Attached to said guiding shaft 16 is the housing 17 of a driving mechanism. This mechanism comprises a flat bar in the form of a rack 18 which slidably extends through said housing and has at its leading end a flat head 19 supporting a relient pawl member 20. The catch 21 of of the pawl member 20 projects from the narrow surface of the rack 18 facing the guiding shaft 16 and is adapted to engage the holes 15 of two coupling laminations 4 simultaneosuly. The rack 18, the head 19 and the pawl member 20, 21 are so thin as to allow their insertion into the gap 14 between the core parts 1, 2 (FIG. 5). The rack is reciprocated by a toothed wheel 22 which is coupled in a manner not shown with the motor 8 through the flexible driving shaft 9 (see FIG. 3).

In the device arranged in accordance with the invention the guiding shaft 16 is provided at its discharge end with projecting fixing members 23 and 24 (FIGS. 4, 6, 7). These fixing members are provided in such as offset relation in respect of the discharge opening of the guiding shaft 16, that they are adapted to engage the space confined between protruding laminations 12, 13 and lying next to the space 25, in which two coupling laminations 4 have to be inserted (FIGS. 4, 6). The fixing members 23 are arranged near the narrow edges and the fixing member 24 is provided in the middle of a long edge of the discharge opening of the guiding shaft 16. The fixing member 24 is inserted into the gap 14 between the core parts 1, 2 and it may be a projection which is sturdy in relation to the fixing members 23. Due to the fact that the fixing members do not engage the space 25, in which the coupling laminations 4 have to be inserted, the coupling laminations may be made as broad as the spaces, so that the coupling laminations 4 join the core parts 1 and 2 well and the magnetic losses due to the coupling are reduced.

Before the coupling laminations to be inserted are engaged by the head 19 comprising the pawl member 20, 21, they are inserted manually with their leading edges into the relevant space. In that case it is possible, that the leading edge of the coupling laminations come into contact with the side edges of the protruding laminations 12, 13, when the latter are not entirely plane and as a result thereof their edges project a little into said space and thus narrow same. This manual insertion of the coupling laminations into the space is facilitated when instead of one single coupling lamination a set of two more coupling laminations lying one on top of the other are inserted in said space and when the coupling laminations of said set are so stacked, that their leading edges 26a, 26b lie in offset relation in the longitudinal direction of said laminations. The insertion of one or more coupling laminations into a space can be further facilitated when said laminations are given a broken or curved leading edge having both bevelled or curved end portions 26' projecting forward and towards each other from the longitudinal edges of the coupling lamination and an intermediate receding portion 26" extending between said end portions (see FIG. 7). In that case the coupling laminations are inserted first with the forward projecting portions 26' lying near their longitudinal edges into the relevant space, where the narrow dimension of the space 25 has the right value due to the adjacent receding laminations of the core parts 1, 2. During the further insertion of the coupling laminations the receding intermediate portions 26" of the leading edges of said laminations make that the protruding laminations 12, 13, which are somewhat bent towards each other and thereby narrow the space 25, are forced gradually away from one another in order to admit the coupling laminations.

The stacking arrangement of the laminated core parts 1, 2 shown in FIG. 8 differs from that shown in FIG. 4 in that the double layers of coupling laminations 4 are separated from one another by single layers of protruding laminations 12, 13. It has been found by tests that the stacking arrangement shown in FIG. 8 is more favorable as to the magnetic losses than that shown in FIG. 4.

It is observed that the invention is not restricted to the stacking arrangement of the layers of the magnetic core structure illustrated in FIGS. 4 and 8. If desired, the ratio between the number of layers of coupling laminations and the number of protruding laminations and the arrangement of these different layers may differ from those shown. The driving mechanism must be adapted to each chosen stacking arrangement.

What I claim:

1. In a transformer or choke coil having first and second parts to be joined, each part being formed of laminations in which the laminations of the two parts lie in common planes and have end edges disposed in spaced, opposed relation, and in which the end edges of corresponding adjacent laminations of the two parts are offset so as to provide a series of spaces opening upon the opposite sides of said parts;

a device for inserting coupling laminations within said spaces, said device comprising a driving bar adapted to be received in a selected space, and abutment member reacting against one side of said parts, said abutment member having one portion aligning said driving bar with said selected space and a guide portion aligned with an adjacent space, said driving bar including a pawl adjacent its leading end projecting laterally therefrom between said parts into the confines of said adjacent space, and means for forcibly projecting said leading end of the driving bar beyond said abutment member so as to project into said selected space; and coupling lamination means comprising at least one coupling lamination for filling said adjacent space, said coupling lamination being received in said guide portion so as to be in alignment with said adjacent space and having an opening adjacent its leading edge receiving said pawl whereby said coupling lamination is pulled from its leading edge into said adjacent space.

2. In the transformer or choke coil according to claim 1 wherein said abutment member includes positioning portions projecting into said selected space and between said parts.

3. In the transformer or choke coil according to claim 1 wherein said coupling lamination has its leading edge of non-rectilinear configuration to facilitate initial insertion thereof into said adjacent space.

4. In the transformer or choke coil according to claim 3 wherein said leading edge of the coupling lamination is concave.

5. In the transformer or choke coil according to claim 1 wherein said coupling lamination means comprises a pair of coupling laminations, said coupling laminations of said pair having dissimilarly placed openings for said pawl whereby the leading edges thereof are offset to facilitate initial insertion thereof into said adjacent space.

References Cited

UNITED STATES PATENTS

| 1,713,786 | 5/1929 | Stearns | 29—203L |
| 1,966,878 | 7/1934 | Bluzat | 29—203L |
| 3,172,067 | 3/1965 | Gee | 336—217 |

FOREIGN PATENTS

| 1,354,694 | 1/1964 | France. |
| 1,044,377 | 9/1966 | Great Britain. |
| 1,048,042 | 11/1966 | Great Britain. |

JOHN F. CAMPBELL, Primary Examiner

D. P. ROONEY, Assistant Examiner

U.S. Cl. X.R.

336—216; 29—211L